UNITED STATES PATENT OFFICE.

JAMES MALCOLM, OF NEW YORK, N. Y.

IMPROVEMENT IN THE MANUFACTURE OF COLORED INDIA-RUBBER AND GUTTA-PERCHA COMPOUNDS.

Specification forming part of Letters Patent No. 51,847, dated January 2, 1866.

*To all whom it may concern:*

Be it known that I, JAMES MALCOLM, of New York, in the county of New York and State of New York, have invented or discovered a new and useful Improvement in Coloring Vulcanized India-Rubber and Gutta-Percha Compounds; and I do hereby declare that the following is a full, clear, and exact description thereof.

In my investigations and experiments on india-rubber I made the discovery upon which this my invention is based, that is, if vulcanized india-rubber or gutta-percha, or other vulcanized gum, be immersed in alcohol or other substance acting in like manner, the surface of such gum becomes changed, so as to render it absorbent of liquid dye and permanently fix the same.

To impart any desirable coloring to vulcanized india-rubber or gutta-percha in a permanent form, I proceed as follows:

The vulcanized rubber to be colored may be prepared in the usual manner. I prefer, however, to form the article from a compound which, when vulcanized, is white or of a cream color, and I have found it best to use with the rubber and sulphur compound sulphuret or oxyde of zinc. The rubber articles so made, and whether hard or soft, may be colored at any time after vulcanization. They are for this purpose immersed, exposed to the solar rays, in alcohol or alcoholic liquid for a time varying with the nature of the compound and with the intensity of light. In a bright sun the process of changing the surface of the rubber is effected more rapidly than on a cloudy or dark day, and so is soft rubber more quickly acted upon than hard rubber. A thin sheet of soft rubber spread on cloth may thus be prepared for the dye-bath in a few minutes, while hard rubber requires several hours. After the requisite change or semi-disintegration of the surface of the gum is effected the article is washed or rinsed in water and then dipped in a suitable dye.

Any of the dyes, whether vegetable, animal, or mineral, may be used.

The time the articles are allowed to remain in the dye-solution varies with the depth or shade of the coloring intended to be produced; but as a general thing the time of immersion in the dye is proportionate to or about that of the immersion of the respective articles in alcohol, so that the soft rubber, which is prepared in alcohol in a few minutes, may be dyed in about the same time, while the hard rubber will require a bath of several hours in the dye.

Having thus described my invention and the manner in which the same is or may be carried into effect, I claim—

The method herein described of coloring or dying vulcanized india-rubber or other vulcanized gum.

JAMES MALCOLM.

Witnesses:
A. POLLOK,
C. SHERWOOD.